Figure 1:
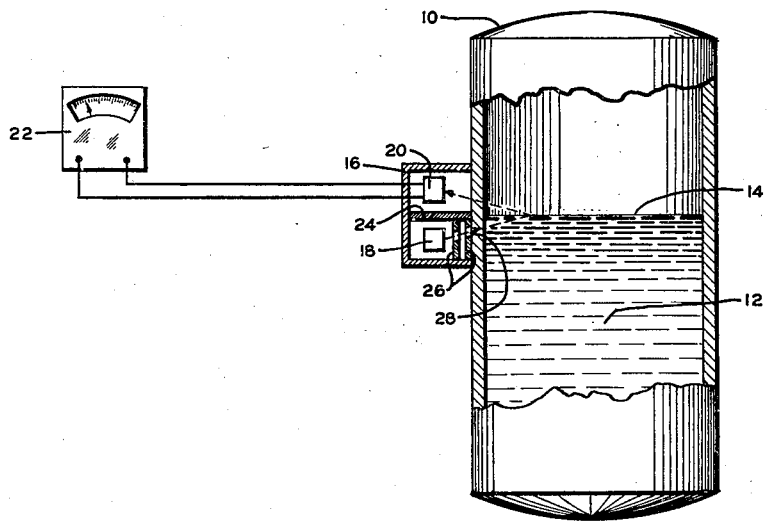

May 16, 1944.    D. G. C. HARE    2,348,810
METHOD AND APPARATUS FOR DETERMINING LIQUID LEVEL
Filed May 29, 1940

D. G. C. HARE
INVENTOR
BY *R. J. Dearborn*
*Daniel Stryker*
HIS   ATTORNEYS

Patented May 16, 1944

2,348,810

UNITED STATES PATENT OFFICE 2,348,810

METHOD AND APPARATUS FOR DETERMINING LIQUID LEVEL

Donald G. C. Hare, Houston, Tex., assignor, by mesne assignments, to The Texas Company, New York, N. Y., a corporation of Delaware Application May 29, 1940, Serial No. 337,864

5 Claims. (Cl. 250—83.6)

This invention relates to a method and apparatus for determining the level of a liquid and particularly to the determination of the level of a liquid such as hydrocarbon oil within a container. The principal object of the invention is to provide a method and apparatus of this type which will indicate accurately the level of a liquid within a container without the necessity of any direct contact with the liquid or of access to the inner side of the container wall.

It is of course frequently desirable to ascertain accurately the level of a liquid which may be contained in a closed vessel. In the past this has been accomplished by means of gauge glasses or by floats or other similar means. Obviously, when the liquid within the container or vessel is subjected to conditions of high temperature or pressure or both, or where the liquid possesses a high viscosity, these methods are not entirely satisfactory. Gauge glasses must be made sufficiently strong to withstand the pressure within the vessel and these glasses often become gummed or clogged so as to render them useless or at least inaccurate. Where a float is used, it is necessary either to provide some electrical system whereby contacts are opened and closed by the float which, of course, is a dangerous procedure when the liquid is inflammable, or to provide some form of stuffing box disposed in the wall of the vessel. If the glands of the stuffing box are made sufficiently tight to prevent leakage they will usually interfere with the free movement of the float arm or linkage.

In accordance with the present invention, a method and apparatus has been provided for determining the level of the fluid behind the walls of a closed container without the necessity of having access to the interior of the container, and without the necessity of any electrical system inside the container or any moving parts such as a float with its attendant stuffing box. Further, the wall of the container may be of any desired material and of considerable thickness. It should, for instance, be practicable to determine the liquid level through a wall of steel of from 2 to 4 inches or more in thickness.

In carrying out the invention an instrument containing a source of radiation such as gamma rays, neutrons or other penetrative particles which have the property of being able to pass through the wall of a container, is adapted to be placed in contact with and moved along the outer surface of the container. Associated with the source of radiation is a device for detecting the rays or particles after these have been scattered and slowed down by the material through which they may pass. This scattering which is similar to diffuse reflection will cause some of the radiation from the source to return to the detector. The amount of scattering which takes place in a given volume of substance is, or the more penetrating radiation, some function of the density of the scattering material. Thus, when the level of the liquid in the vessel is below the region through which the rays from the source pass, the detector will indicate little more than the scattered intensity due to the wall of the vessel, since the density of the vapor in the vessel is low. If, however, the device is placed so that the rays will enter and be scattered by the liquid, there will be a considerable increase in the scattered intensity indicated by the detector due to the fact that the radiation passing through the wall now has a more dense medium, i. e., the liquid to traverse.

Figure 2:
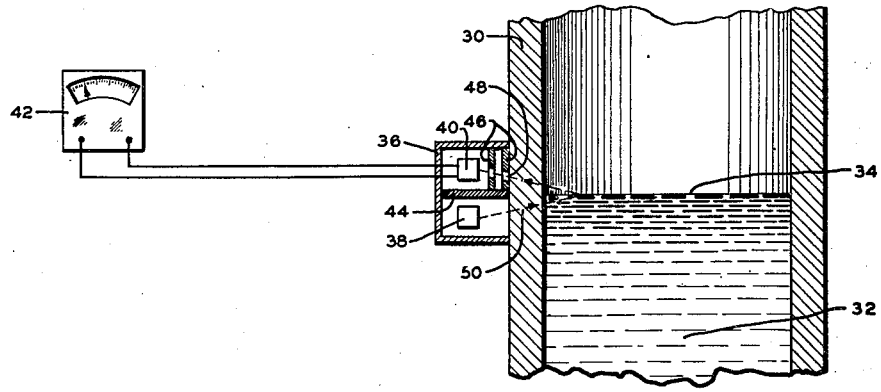

For a better understanding of the invention reference may be had to the accompanying drawing in which Figure 1 is a vertical elevation through a container and through an instrument embodying the invention placed substantially at the level of a body of liquid within the container, while Figure 2 is a similar view showing a slightly modified form of the instrument as used in determining liquid level within a container having walls thicker than those shown in Figure 1.

Referring to the drawing, a closed vessel 10 is shown as having therein a quantity of liquid 12, the level of which is indicated at 14. The walls of this container may be of any thickness up to, say, one inch.

The liquid level detecting instrument comprises a casing 16 having disposed therein a source 18 preferably of gamma rays. The source 18 may comprise, for instance, a radium compound. Also disposed within the casing 16 is a device 20 capable of detecting the rays or particles which may be scattered within the wall of the container and within the liquid 12 and some of which rays will return so as to contact the detector. The detector 20 may be connected electrically to a suitable indicating or recording instrument 22. The source 18 and the detector 20 are preferably separated by means of a lead shield 24 so as to reduce the direct radiation from the source to the detector. A collimating system comprising shields 26 having slits 28 is provided adjacent the source 18 so as to define the area of measurement.

In operation the instrument is placed against the outer side of one vertical wall of the container 10, and rays from the source 18 will pass outwardly through the slits 28 into the wall of the vessel. A certain amount of the radiation will be scattered back to the detector 20 by the walls of the vessel, but as long as the walls are fairly uniform or the instrument is in one position this observed intensity will be fairly constant. The amount of scattering which takes place in a given volume of substance is, for the more penetrating radiation, some function of the density of the scattering material. Thus, if the instrument is placed above the liquid level 14 the detector 20 or rather the meter 22 will indicate little more than the scattered intensity due to the wall of the vessel, since the density of the air or vapor in the vessel is substantially negligible. If, however, the instrument is placed against the vessel below the liquid level 14, the meter 22 will indicate a considerable increase in the scattered intensity due to the fact that the radiation passing through the wall is scattered not only by the material of the vessel wall but also by the liquid within the vessel. Thus, by moving the casing 16 vertically along the vessel the exact level 14 of the liquid will be indicated by the meter 22.

The foregoing discussion refers primarily to the case where the walls of the vessel are not much more than one inch in thickness and in this case the gamma rays from a substance such as radium or thorium may be used. For vessels whose walls are not thicker than this the use of gamma rays is to be preferred since the technique of measurement of these rays is somewhat simpler than that for other penetrative radiation. If, however, it is desired to measure the liquid level in a vessel having very thick walls, another technique may be employed which will give equally satisfactory results. To this end, in Figure 2 is shown a vessel 30 having therein a quantity of liquid 32 with the level of the liquid indicated as at 34. The walls of this vessel may be of from say 1 to 4 inches in thickness. The instrument employed in this modification is quite similar to that described in connection with Figure 1 and a casing 36 has disposed therein a source 38 of fast neutrons and a device 40 capable of detecting slow neutrons, such as an ionization chamber filled with boron trifluoride. The detector 40 is connected to a suitable meter 42 and is separated from the source 38 by means of a lead shield 44 to prevent undesired direct gamma radiation which might otherwise cause an unwanted background effect. The lead will tend to prevent passage of slow neutrons from the source 38 directly to the detector, and fast neutrons which may pass through the lead are not easily detected by means of the detector 38. In this case the collimating system 46 having slits 48 is placed adjacent the detector 40 since while fast neutrons will penetrate several inches in even a heavy material, slow neutrons may be easily stopped by such substances as cadmium of which the collimating shields may be formed. The fast neutrons indicated by the dotted line 50 are little affected by the walls of the vessel and will pass through a fairly thick piece of steel without losing much of their energy or velocity even though they may be widely scattered. However, a fast neutron is very rapidly slowed down in any substance containing hydrogen since the neutron gives up on the average about one half of its energy at each collision with a hydrogen nucleus. These neutrons in the process of being slowed down are also scattered in all directions and many of them will "diffuse" back through the wall of the vessel to be detected by the device 40. Thus, when a hydrogenic liquid 22 is present in the vessel in the region traversed by the neutrons, a fairly large number of slow neutrons will be detected at 40 and observed at the meter 42, while in the absence of any hydrogenic liquid very few slow neutrons will be observed. Thus, as was the case in connection with the embodiment disclosed in Figure 1, it is merely necessary to move the casing 36 vertically along the outside of the vessel 30 and to note the point where the meter 42 will indicate a sudden change in the response of the detector 40.

It is to be understood that this invention can be used in various other ways than those which have been described. For instance, if it is desired to maintain a definite liquid level within the container, either of the casings 16 or 36 may be more or less permanently secured to the outer wall of the vessel at the point at which it is desired to maintain the level of the liquid. Either of the detectors 20 or 40 can then be connected as is well known to those versed in the art so as to operate suitable control devices such as valves for allowing more or less liquid to pass into the vessel. Either of the instruments can also be connected so as to operate a suitable alarm or warning signal.

Obviously many modifications and variations of the invention, as hereinbefore set forth, may be made without departing from the spirit and scope thereof, and therefore only such limitations should be imposed as are indicated in the appended claims.

I claim:

1. A method of determining the level of a liquid in a closed container which comprises directing through the wall of said container gamma radiation emitted from a source, detecting gamma radiation scattered by the liquid within the container, and moving the source and detecting means vertically along the container until a point is reached at which a sudden increase or decrease in the amount of scattered gamma radiation is indicated by the detecting means.

2. A method of determining the level of a liquid in a container which comprises placing near the outer surface of the side wall of said container a source of gamma radiation so that gamma rays will pass through said wall and be scattered by the material of the wall and the material within the container, detecting rays so scattered and returned outwardly through said container wall, and determining from the number of rays detected whether or not a liquid is present within the container and opposite the source of radiation.

3. A method of determining the level of a liquid in a closed container which comprises placing near the outer surface of the side wall of said container a source of gamma radiation so that gamma rays will pass through said wall and be scattered by the material of the wall and the material within the container, detecting rays so scattered and returned outwardly through said container wall, moving the source and detecting means vertically along the outer side surface of said wall until a point is reached at which a sudden increase or decrease in the number of returned scattered rays is indicated by the detecting means.

4. A device for determining the level of a liquid in a container, which comprises a housing, a source of penetrating gamma radiation in said housing, said housing adapted to be held against the outer surface of the side wall of said container at a predetermined point, a device in said housing for detecting gamma radiation emitted by said source and scattered in the material within said container, a shield to reduce direct radiation from said source to said detecting means, and an instrument connected to said detecting means for indicating the amount of scattered radiation returned to said detecting means, the amount of said returned scattered radiation depending upon whether or not the liquid level is higher or lower than said point.

5. A device for determining the level of a liquid in a container, which comprises a housing, a source of gamma rays in said housing, said housing adapted to be held against the outer surface of the side wall of said container, a device in said housing for detecting rays emitted by said source and scattered in said wall and in the material within said container, a shield to reduce direct radiation from said source to said detecting means, a collimating system within said housing and comprising shield members provided with slits for directing the gamma rays into the container and to define the area of measurement, and an instrument connected to said detecting means for indicating the amount of scattered gamma radiation returned to the detecting means.

DONALD G. C. HARE.